(12) United States Patent  
Skiles (10) Patent No.: US 7,571,916 B2
(45) Date of Patent: Aug. 11, 2009

(54) TRAILER WITH COORDINATED AXLE STEERING AND STABILIZING CASTOR AND TRACK ASSEMBLY

(76) Inventor: Gerald Duane Skiles, 407 S. 7th, Atwood, KS (US) 67730

( * ) Notice: Subject to any disclaimer, the term of this patent is extended or adjusted under 35 U.S.C. 154(b) by 191 days.

(21) Appl. No.: 11/553,378

(22) Filed: Oct. 26, 2006

(65) Prior Publication Data

US 2007/0090625 A1    Apr. 26, 2007

Related U.S. Application Data

(60) Provisional application No. 60/730,589, filed on Oct. 26, 2005.

(51) Int. Cl.
*B62D 7/14* (2006.01)
*B62D 13/04* (2006.01)

(52) U.S. Cl. ............... 280/100; 280/81.6; 280/91.1; 280/98; 280/408; 280/426; 280/442; 180/24.01

(58) Field of Classification Search ............ 280/100, 280/442, 408, 426, 98, 81.6, 443, 444, 99, 280/91.1; 180/24.01
See application file for complete search history.

(56) References Cited

U.S. PATENT DOCUMENTS

| 1,028,866 | A | * | 6/1912 | Eadie | 280/100 |
|---|---|---|---|---|---|
| 3,149,858 | A | * | 9/1964 | Gilbert | 280/442 |
| 3,292,725 | A | * | 12/1966 | Hlinsky | 180/414 |
| 3,529,848 | A | * | 9/1970 | Harvey | 280/99 |
| 3,620,549 | A | * | 11/1971 | Miller et al. | 280/99 |
| 3,853,330 | A | * | 12/1974 | Hanaoka | 280/99 |
| 4,720,119 | A | * | 1/1988 | Ritter | 280/443 |
| 5,090,719 | A | * | 2/1992 | Hanaoka | 280/408 |
| 5,320,376 | A | * | 6/1994 | Bojarski et al. | 280/442 |
| 5,477,937 | A | * | 12/1995 | Chagnon | 180/24.01 |
| 6,554,298 | B1 | * | 4/2003 | Bidwell | 280/47.11 |
| 6,619,680 | B2 | * | 9/2003 | Platteeuw et al. | 280/100 |
| 2002/0180178 | A1 | * | 12/2002 | Masters et al. | 280/426 |
| 2004/0227316 | A1 | * | 11/2004 | Drummond | 280/79.11 |
| 2005/0077703 | A1 | * | 4/2005 | Tango | 280/442 |

OTHER PUBLICATIONS

Author Unknown, "Row Tracker" Advertisement flyer, JD Skiles Company, at least as early as Oct. 26, 2005, 1 page.
Pictures (submitted in both black and white and in color) of a Big John trailer, identified as A-1 through A-5, publicly available in the U.S. at least as early as Jan. 2006, 10 pages.

* cited by examiner

*Primary Examiner*—John Q. Nguyen
*Assistant Examiner*—James English
(74) *Attorney, Agent, or Firm*—Dorsey & Whitney LLP (57) ABSTRACT

A trailer having a frame assembly with front and rear axle beams rotationally coupled to the frame assembly. At least one member interconnects the front and rear axle beams to synchronize movement of the axle beams allowing the front and rear wheels to track one another. In one embodiment a first member connects the right front axle beam with the left rear axle beam and a second member connects the left front axle beam with the right rear axle beam causing the rear axle beam to rotate in the opposite direction of the front axle beam when the front axle beam turns. The push-pull operation of the members cause the rear wheels to track the front wheels.

19 Claims, 14 Drawing Sheets

TRAILER WITH COORDINATED AXLE STEERING AND STABILIZING CASTOR AND TRACK ASSEMBLY

CROSS-REFERENCE TO RELATED APPLICATIONS

This non-provisional application claims the benefit of U.S. Provisional Application No. 60/730,589, entitled "Trailer Stabilizing Caster and Track Assembly," filed Oct. 26, 2005.

FIELD OF THE INVENTION

This invention relates generally to farm equipment and more specifically to a dual axle trailer employing a mechanism that synchronizes movement of the axles to allow the front and rear wheels to track one another.

BACKGROUND

Modern day farming utilizes trailers to haul a variety of loads. Such trailers are generally towed behind a vehicle connected to the trailer using a hitch pivotally connected to the front axle of the trailer. The trailers generally have front and rear axles with wheels. As the towing vehicle turns, it carries the hitch along with it causing the front axle to turn together with its wheels. The rear wheels generally do not track the front wheels resulting in a wider turning radius for the trailer. Such a wide turning radius of conventional trailers can have various drawbacks including causing the rear wheels of the trailer to jump over rows in a farm field.

Accordingly, what is needed is a trailer in which the rear wheels track or follow the front wheels. Such an arrangement, as set forth in detail below, may present several advantages including keeping the front and rear wheels in the same rows and offering a much tighter turning radius than conventional trailers.

SUMMARY

One aspect of the present invention involves a trailer having a frame assembly with a front section and a rear section. The trailer has a front axle beam rotatably coupled to the front section of the frame assembly with the front axle beam rotatably supporting a pair of front wheels. The trailer further has a rear axle beam rotatably coupled to the rear section of the frame assembly with the rear axle beam rotatably supporting a pair of rear wheels. The trailer also has at least one member operably coupled between the front axle beam and the rear axle beam that synchronizes rotation of the front axle with the rear axle causing the front wheels and rear wheels to track one another.

Another aspect of the present invention involves a trailer having a frame assembly with a front section and a rear section. The trailer has a front axle beam rotatably coupled to the front section of the frame assembly with the front axle beam rotatably supporting a pair of front wheels. The trailer further has a rear axle beam rotatably coupled to the rear section of the frame assembly with the rear axle beam rotatably supporting a pair of rear wheels. The trailer also has a rear load stabilizing mechanism operably connected to the rear axle beam and the rear section of the frame assembly and at least one member operably coupled between the front axle beam and the rear axle beam that synchronizes rotation of the front axle with the rear axle causing the front wheels and rear wheels to track one another.

DETAILED DESCRIPTION

Aspects of the present invention involve a trailer with interconnected front and rear axle beams. Each axle beam provides rotational support for a pair of wheels. The interconnection of the front and rear axle beams results in the rear wheels tracking the front wheels during turns, thus causing the rear wheels to follow the front wheels in the same rows, and providing enhanced maneuverability due to a tight turning radius. In some respects, a trailer conforming to some aspects of the invention may be considered to provide a form of four wheel steering. Another aspect of the present invention involves a load stabilizing configuration, such as castors and tracks, that stabilize and support the trailer load, among other functions, when the trailer corners.

Figure 1:
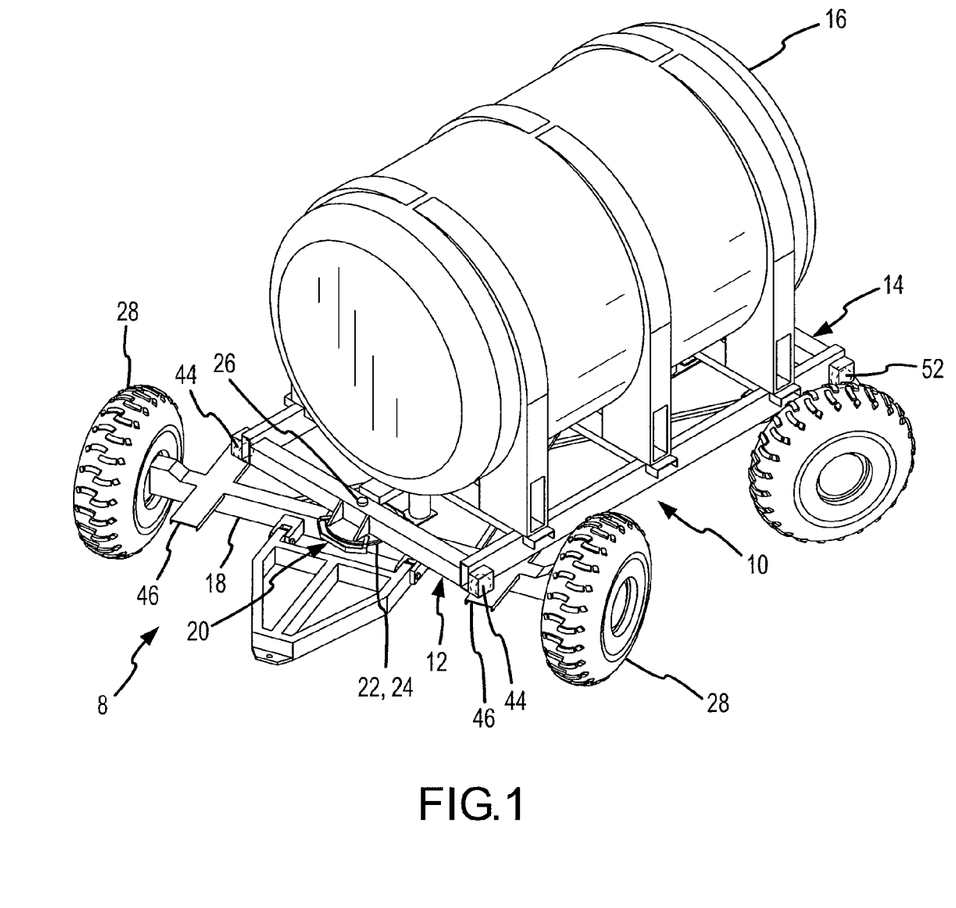
FIG. 1 is an isometric view of a trailer conforming to one embodiment of the present invention.

FIGS. 1-4 depict various isometric views of one particular trailer conforming to aspects of the present invention. FIG. 1 shows the trailer supporting a tank. The trailer 8 has a frame assembly 10 with a front section 12 and a rear section 14. The frame assembly provides support for a variety of loads such as a tank 16; however, the frame assembly may be configured in any number of ways, including, but not limited to, support for a flat bed, a spreader, and the like.

A front axle beam 18 is rotationally coupled with the front section 12 of the frame 10. In one particular configuration, the front axle beam is rotationally connected to the front section 12 of the frame assembly 10 using a front plate assembly 20 that includes a first plate 22 attached to the center of the underside of the front section of the frame assembly, a second plate 24 attached to the center of the top side of the front axle beam and a front king pin 26. The plates 22, 24 abut each other and the king pin 26 passes through a front frame member 12 of the frame assembly 10, the two plates, and the axle beam 18. It is possible to provide a trailer without the plate assembly depending on the load bearing rating of the king pin, and other stabilizing configurations deployed, such as the castor/track assembly discussed below. In one embodiment the two plates 22, 24 may each be about twenty inches in diameter and about ⅝ inch thick. Some embodiments may use one or more sleeves in the aperture holding the king pin 26 to provide a rotational interface between the pin and frame members, which may facilitate smooth rotation of the axle beam.

The front axle beam 18 provides support for a pair of wheels 28 rotationally connected to the front axle beam. In one particular implementation, each wheel is supported on an independent axle extending from the respective end of the axle member. It is also possible to have a single axle extending through the axle beam, and supporting a wheel at each end. In either implementation, the wheels rotate independently. Independent wheel rotation, while not required, helps prevent the wheels from hopping or skidding due to rotational differences between a wheel on the inner radius and one on the outer radius of a turn.

Figure 2A:
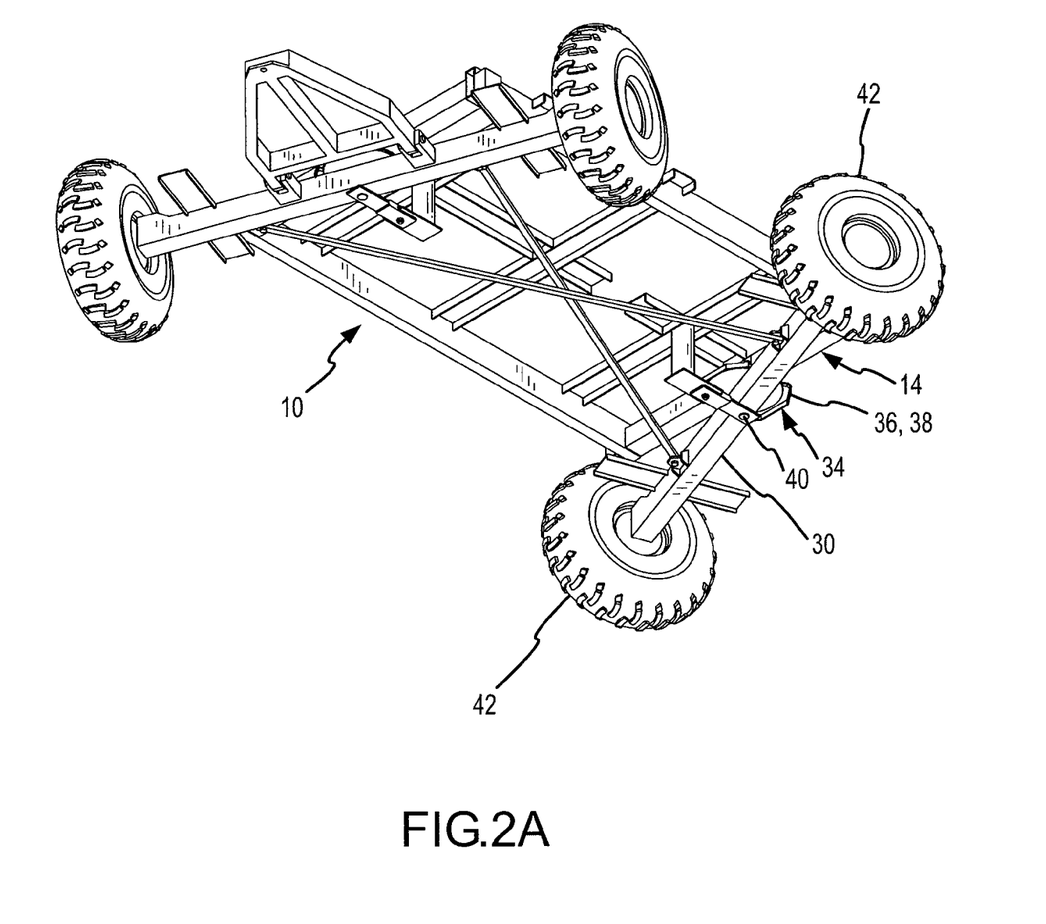
FIG. 2A is an isometric view of the bottom of the trailer showing how the front axle and rear axle rotate in coordination during a turn.

The rear axle assembly is substantially similar to the front. Referring now to FIG. 2A, a rear axle beam 30 is also rotationally coupled with the rear section of the frame. In one particular configuration, the rear axle beam is rotationally connected to the rear section 14 of the frame assembly 10 using a rear plate assembly 34 that includes a third plate 36 attached to the center of the underside of the rear section of the frame assembly, a fourth plate 38 attached to the center of the top side of the rear axle beam 30 and a rear king pin 40. The plates 36, 38 abut each other and the king pin 40 passes through a rear frame member 14 of the frame assembly 10, the two plates, and the axle beam 30. It is possible to provide a trailer without the plate assembly depending on the load bearing rating of the king pin, and other stabilizing configurations deployed, such as the castor/track assembly discussed below. In one embodiment the two plates 36, 38 may each be about twenty inches in diameter and about 5/8 inch thick. Some embodiments may use one or more sleeves in the aperture holding the king pin 40 to provide a rotational interface between the pin and frame members, which may facilitate smooth rotation of the axle member.

The rear axle beam 30 provides support for a pair of wheels 42 rotationally connected to the rear axle beam. In one particular implementation, each wheel is supported on an independent axle extending from the respective end of the axle member. It is also possible to have a single axle extending through the axle beam, and supporting a wheel at each end. In either implementation, the wheels rotate independently.

Figure 2B:
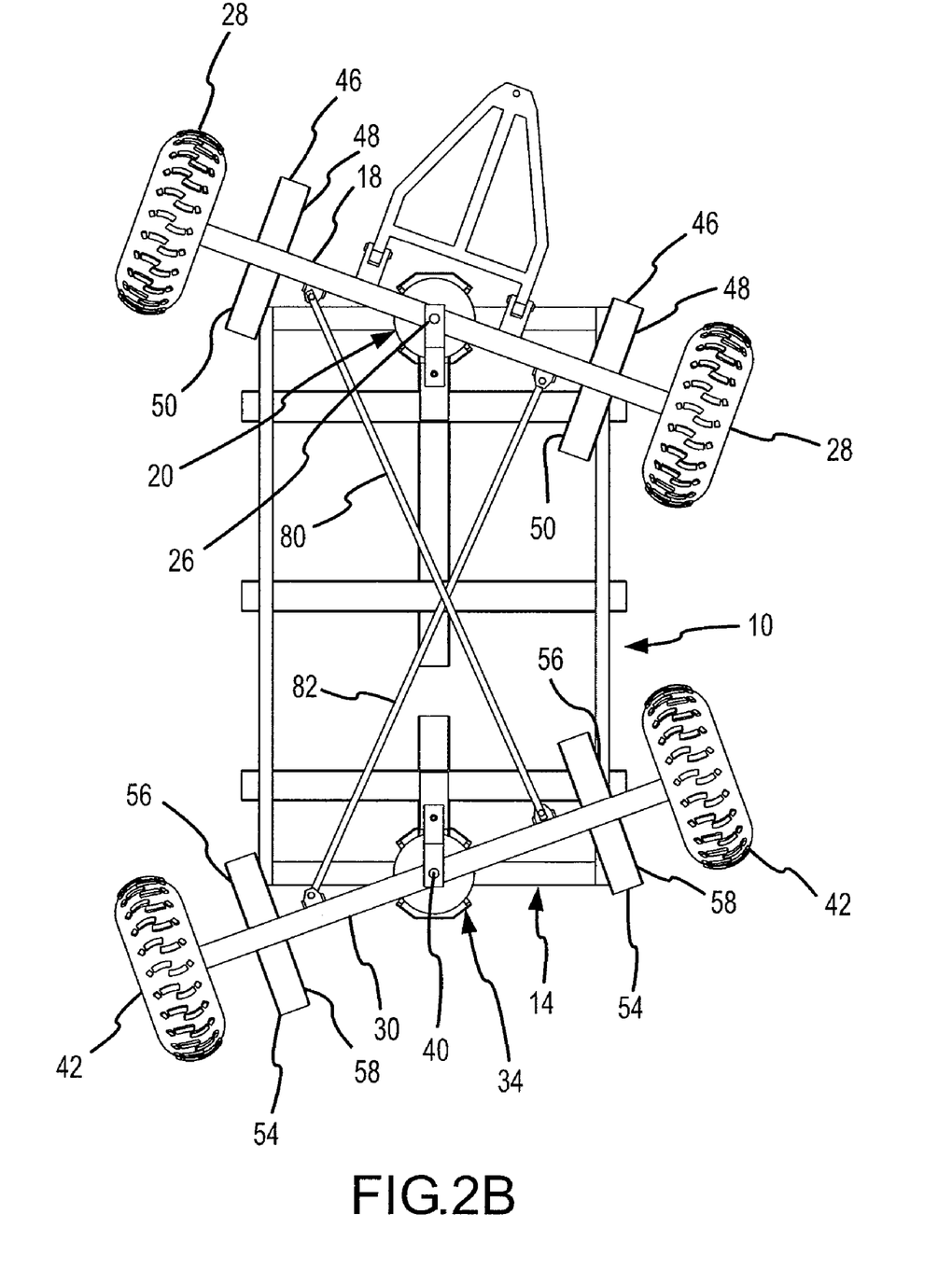
FIG. 2B is a bottom view of the trailer shown in FIG. 2A.

To distribute the trailer load from the king pin and front plate assembly, the trailer may include side support assemblies. In the particular implementation of FIGS. 1-4, the side support assemblies include a pair of castors 44 rotationally connected to the right and left sides of the front section 12 of the frame assembly 10. Referring now to FIG. 2B, the castors ride on a pair of tracks 46 operably connected to the front axle beam 18. Each track has a front section 48 that extends forward from the axle beam and a rear section 50 that extends backward from the axle beam. The two track sections of the track form a rolling surface for the corresponding castor. As the front axle beam 18 rotates relative to the frame assembly 10, the castors trace an arc along the tracks. The castors and tracks stabilize the load on the frame assembly and reduce the torque placed on the king pin 26 and plate assembly 20 reducing vertical play between the frame assembly and the front axle beam as the trailer turns. Other embodiments may employ wheels, balls, plates or other mechanisms that roll or slide along the tracks instead of castors. It is possible to deploy a trailer without such a stabilizing configuration; however, such a trailer would likely involve an enhanced king pin and plate assembly to support the load.

In the particular implementation of FIGS. 1-4, rear side support assemblies are arranged similarly to the front side support assemblies. A pair of castors 52 (best shown in FIG. 4) are rotationally connected to the right and left sides of the rear section 14 of the frame assembly 10. Referring again to FIG. 2B, the castors ride on a pair of tracks 54 operably connected to the rear axle beam 30. Each track has a front section 56 that extends forward from the axle beam and a rear section 58 that extends backward from the axle beam. The two track sections of the track form a rolling surface for the corresponding castor. As the rear axle beam 30 rotates relative to the frame assembly 10, the castors trace an arc along the tracks. The castors and tracks stabilize the load on the frame assembly and reduce the torque placed on the king pin 40 and plate assembly 34 reducing vertical play between the frame assembly and the rear axle beam as the trailer turns. It is possible to deploy a trailer without such a stabilizing configuration; however, such a trailer would likely involve an enhanced king pin and plate assembly to support the load.

Figure 11:
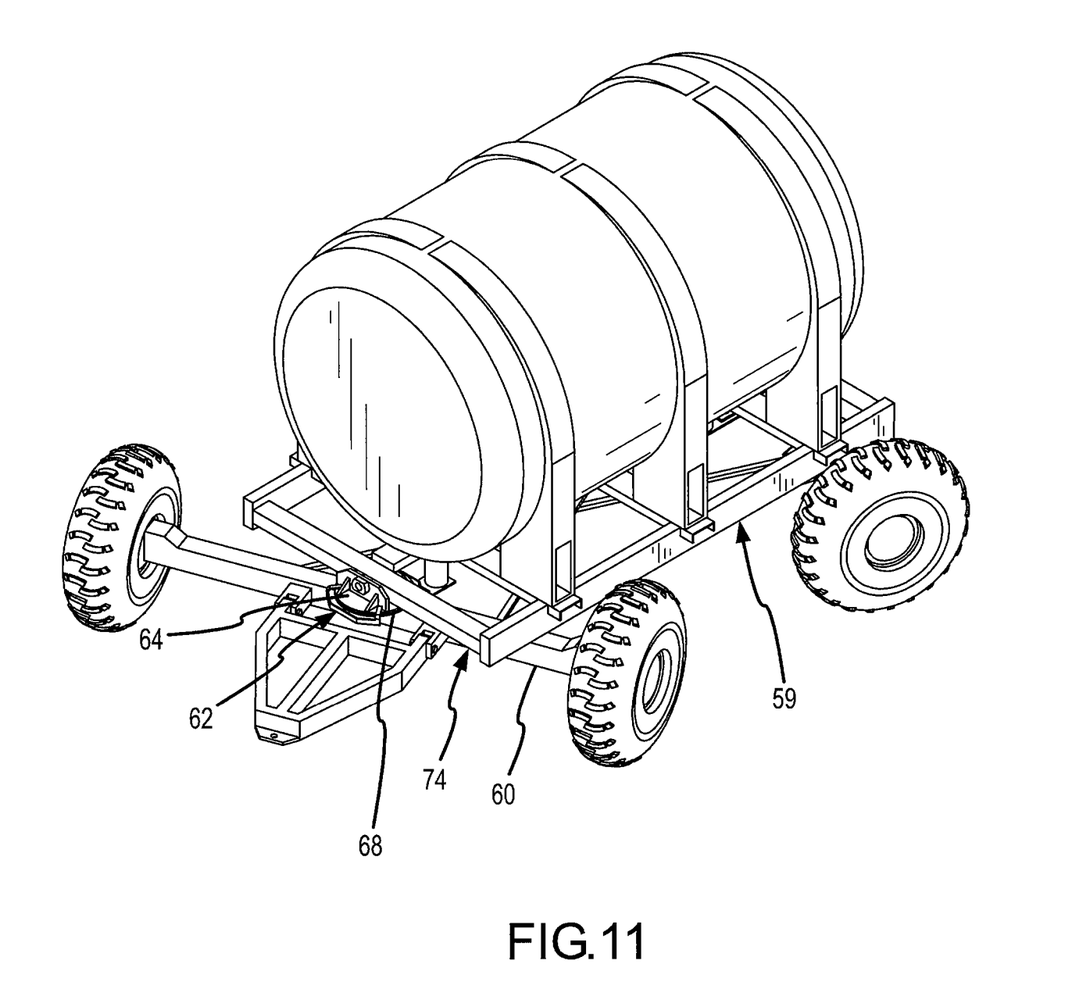
FIG. 11 is an isometric view of a trailer conforming to one embodiment of the present invention.
Figure 12:
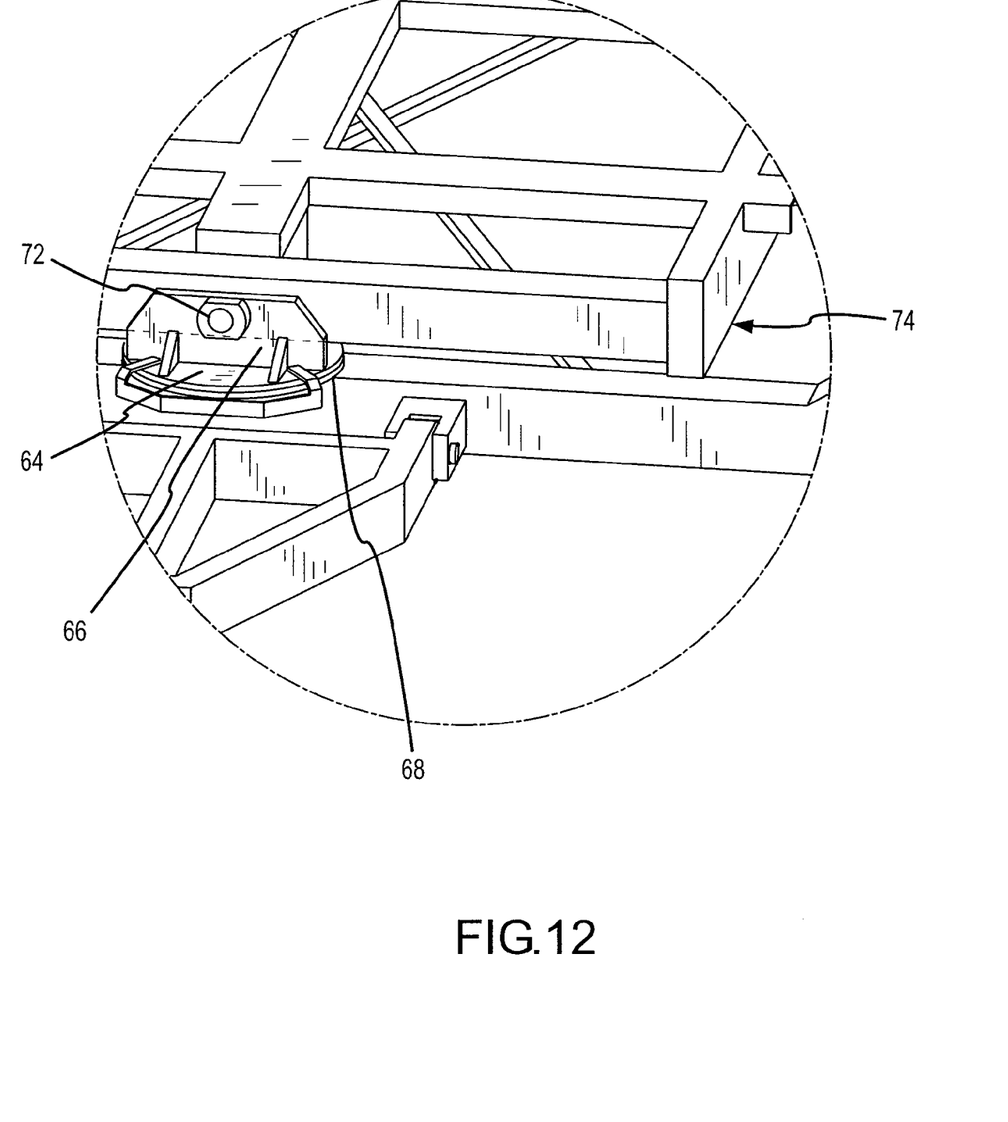
FIG. 12 is a close-up view of the right front of the trailer of FIG. 11.

In another embodiment, depicted in FIG. 11, the frame assembly 59 may be rotatably coupled to the front axle beam 60 using an alternative plate assembly 62. The alternative plate assembly includes a first plate 64 having a pair of vertical plates 66 (of which only the front vertical plate is shown) connected to the first plate to form a u-shaped bracket, a second plate 68 attached to the center of the top side of the front axle beam and a front king pin. A transverse pin 72 passes through the two vertical plates and the front section 74 of the frame assembly. This allows the frame assembly to rock from side to side relative to the front axle beam. The first and second plates 64, 68 abut each other and the king pin passes through the two plates and the axle beam 60 to allow the front axle beam to rotate relative to the frame assembly. Thus, this configuration provides a two-dimensional pivoting coupling between the front section 74 of the frame assembly 59 and the front axle beam 60. A close-up view of the right front portion of the trailer of FIG. 11 is shown in FIG. 12.

In this embodiment, only rear side support assemblies, as described above are used to stabilize the load. Use of front side support assemblies would restrict the range of teetering of the front section 74 of the frame assembly 59 about the transverse pin 72. Alternatively, it is possible to provide front assemblies with spring loaded castor wheels, which allow the castor wheels to translate vertically. Accordingly, when the front frame teeters about the transverse pin, such as when the wheels roll over rocks or other obstructions, the castor wheels are pressed upward by the track and against the spring face. When the frame returns to its neutral position, the castor wheel, under spring force, returns to its downward position. Such an implementation may also be deployed at the rear with a corresponding rear transverse pin arrangement thus allowing all wheels to translate somewhat vertically with respect to the frame assembly.

Figure 3A:
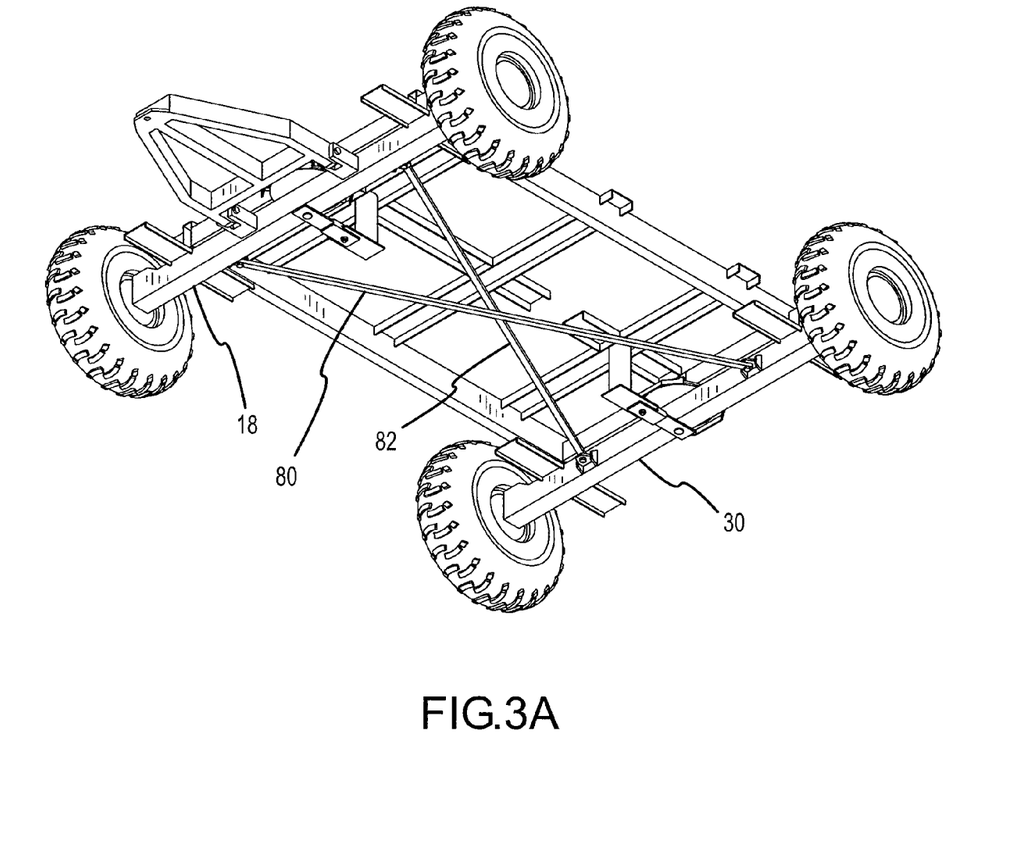
FIG. 3A is an isometric view of the bottom of the trailer showing the orientation of the front axle and rear axle when the trailer is not turning.
Figure 3B:
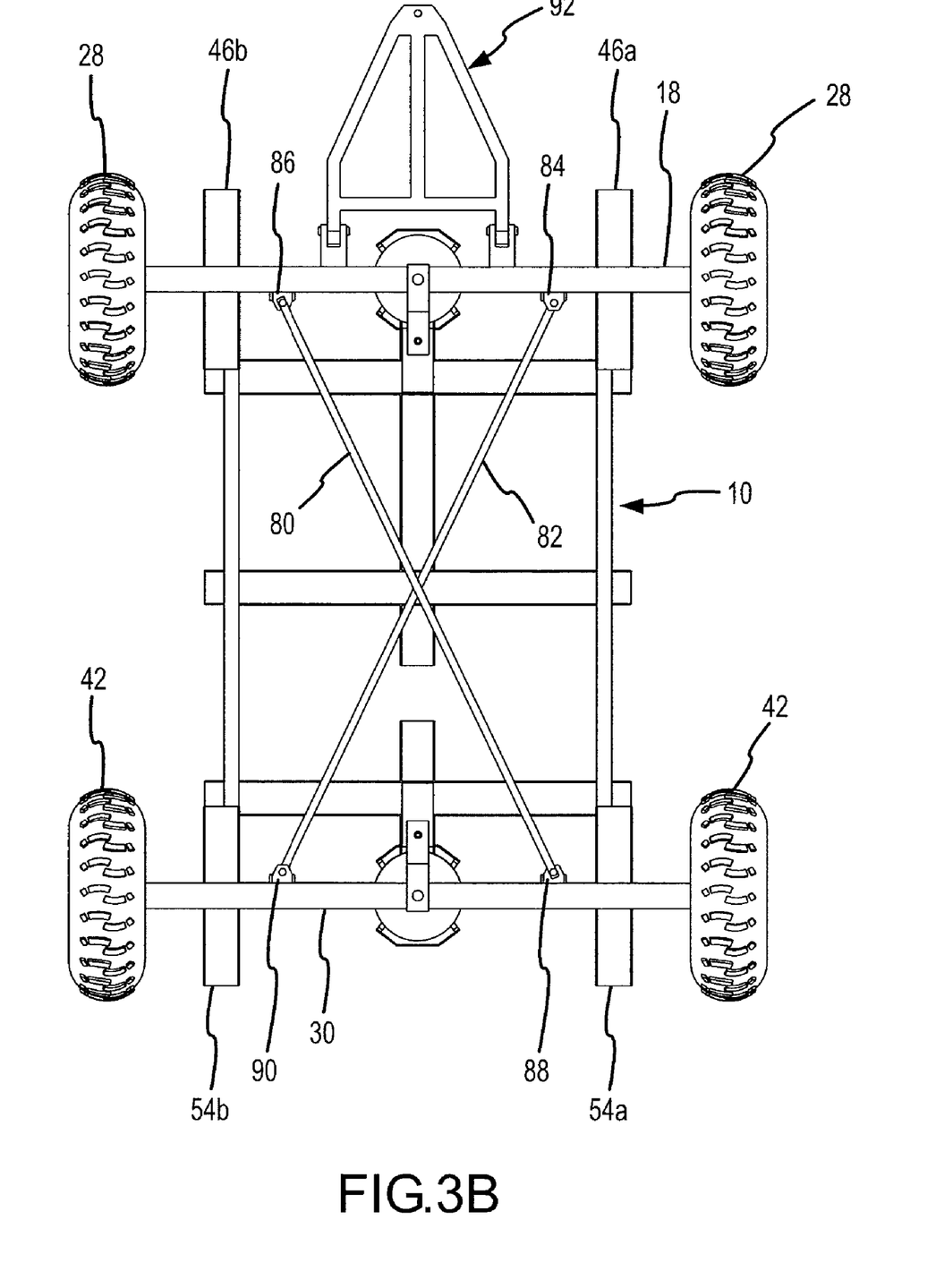
FIG. 3B is a bottom view of the trailer shown in FIG. 3A.

FIG. 2A particularly depicts an isometric view of the bottom side of the trailer during a left turn. FIG. 2B depicts a bottom view of the trailer shown in FIG. 2A. FIGS. 3A and 3B illustrate a bottom isometric view and bottom view, respectively, with the axles in a straight tracking position. With particular reference to the bottom views, coordinated steering or rotation of the front and rear wheels is achieved through synchronizing members operably interconnected between the front and rear axle members. Referring to FIG. 3A, in a first exemplary embodiment the front axle beam 18 and rear axle beam 30 may be operably coupled by a first member 80 and a second member 82 such that the first member and second member form an x between the two axle beams (when the trailer is not turning).

Referring now to FIG. 3B, in one particular synchronizing rod configuration, the front axle beam 18 has a left mounting bracket 84 and a right mounting bracket 86, configured to rotationally support the respective synchronizing members. The left bracket 84 is generally located between the center of the front axle beam and the left front track 46a. The right bracket 86 is generally located between the center of the front axle beam and the right front track 46b at about the same distance from the center of the front axle beam as is the left bracket. The rear axle beam 30 also has a left mounting bracket 88 located between the center of the rear axle beam and the left rear track 54a and a right mounting bracket 90 located between the center of the rear axle beam and the right rear track 54b, configured to rotationally support respective synchronizing members. The two rear brackets 88, 90 and the two front brackets 84, 86 are generally located about the same distance from the center of the rear beam or front beam, respectively. The first member 80 is pivotally attached to the lower side of the right front bracket 86 and the lower side of the left rear bracket 88. The second member 82 may be mounted to the top side of the left front bracket 84 and the top side of the right rear bracket 90.

As shown by FIG. 2B, the trailer may include a hitch assembly pivotally attached to the front axle beam. When the hitch assembly 92 rotates the front axle beam 18, relative to the frame assembly 10, members 80, 82 cause the rear axle beam 30 to rotate in the opposite direction relative to the frame assembly 10. This results in the rear set of wheels 42 following in the same tracks as the front set of wheels 28, thus keeping the trailer wheels in the same rows when going in a straight line or when cornering. This also results in a much tighter turning radius.

More particularly, when the front axle beam 18 turns right, the synchronizing member 82, attached to the left side of the front axle beam and the right side of the rear axle beam 30, pulls the right side of the rear axle beam forward. The synchronizing member 80, attached to the right side of the front axle beam and the left side of the rear axle beam, pushes the left side of the rear axle beam rearward. The push-pull operation of the synchronizing members cause the rear wheels to track the front wheels during a right turn.

In a similar fashion, when the front axle beam 18 turns left, the synchronizing member 82, attached to the left side of the front axle beam and the right side of the rear axle beam 30, pushes the right side of the rear axle beam rearward. The synchronizing member 80, attached to the right side of the front axle beam and the left side of the rear axle beam, pulls the left side of the rear axle beam forward. Again, the push-pull operation of the synchronizing members cause the rear wheels to the track the front wheels during a left turn.

Further, when the front axle member is turned, the synchronizing members 80, 82 slide back and forth relative to one another. The point of intersection, where the members cross over each other, moves in a horizontal line, centered between the two axle beams. The point of intersection moves to the right during a right turn and moves to the left during a left turn.

A single synchronizing member may be used to interconnect the front axle beam and the rear axle beam in other implementations of the invention to provide similar front and rear wheel tracking. The single synchronizing member may be connected to the left side of the front axle beam and the right side of the rear axle beam or vice versa.

FIG. 3B shows a bottom view of the trailer depicted in FIG. 3A. In one embodiment, the mounting brackets 84, 86, 88, 90 may be located about the same distance from the center of the axle beams 18, 30 such that the members form an x configuration when the two axle beams are parallel to each other. It should be noted that spacing of the mounting brackets from the center of the axle beam determine the amount of leverage provided by the members. The closer the brackets are to the center of the axle beam, the less leverage provided. Various embodiments of the present invention may use mounting brackets spaced closer or farther apart depending on the particular implementation. Other embodiments may use fewer or more members to interconnect the front and rear axle beams 18, 30 depending on the particular implementation.

Figure 4:
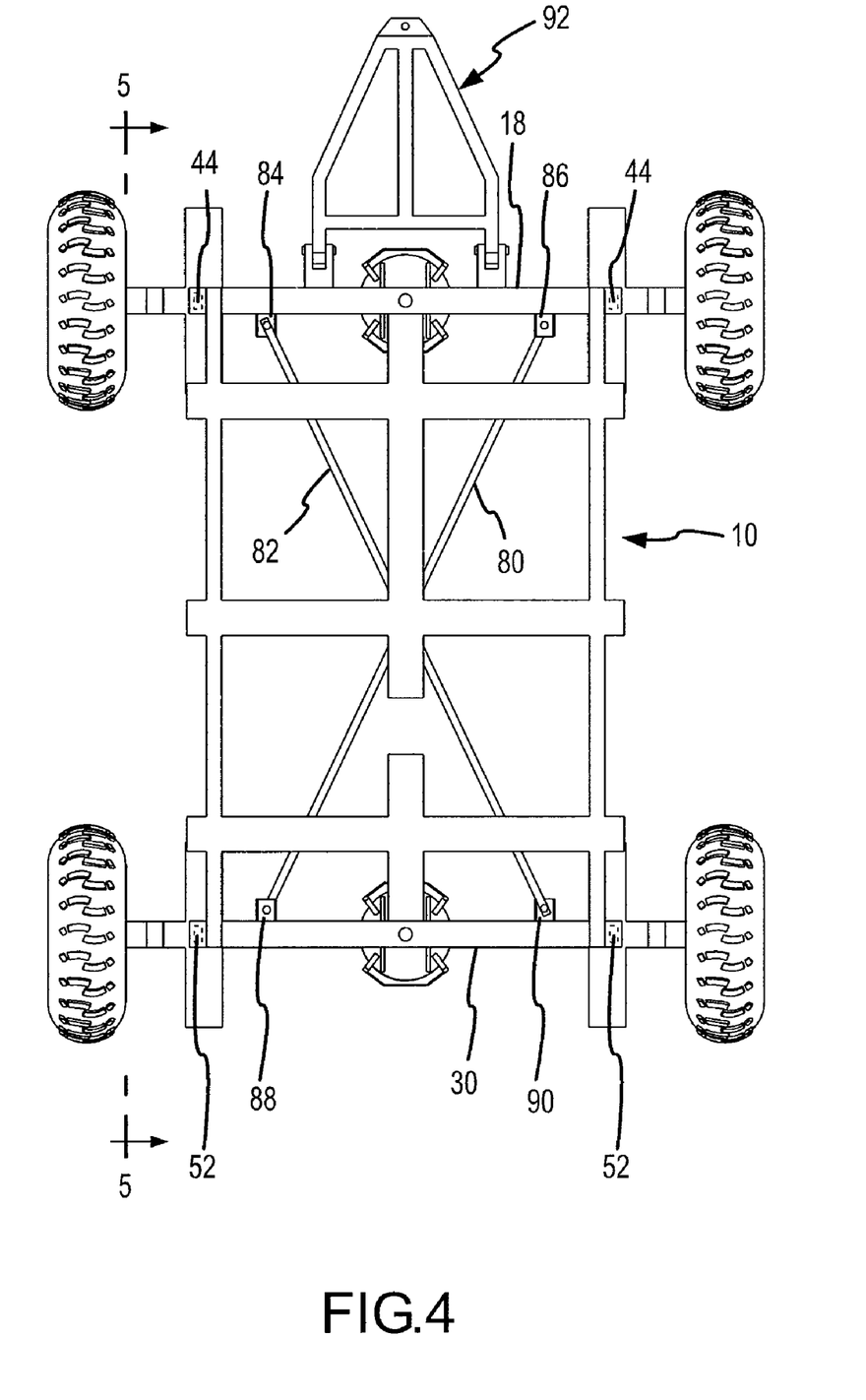
FIG. 4 is a top view of the trailer shown in FIG. 3A.

FIG. 4 shows a top down view of the trailer without a load. When the trailer travels in a straight line, the four castors at each corner of the frame assembly generally contact the corresponding track at the outer edge of the center of each track. As the trailer turns, the castors trace an arc along the tracks such that the castors become positioned at the inner edges of the tracks during the trailer's minimum turning radius as depicted in FIG. 2B.

In one implementation, the bottom plate 22 of the front axle beam 18 may have a bracket 94 (best shown in FIG. 6) that extends downward. The bracket operates to limit the rotation of the axle beam during turns to prevent the wheels from contacting the frame assembly 10 of the trailer. The rear assembly of the trailer may have a similar configuration to restrict the rotational movement of the rear axle beam. Other implementations may use other mechanisms to restrict the rotational movement of the axle beams. These include, but are not limited to, a pin attached to one plate that is adapted to mate with a slot in the other plate, stops on the tracks that stop rotation of the axle beam when the stops are hit by the castor housing, or tabs on the bottom plate that restrict the rotational movement of the axle beam.

Figure 5:
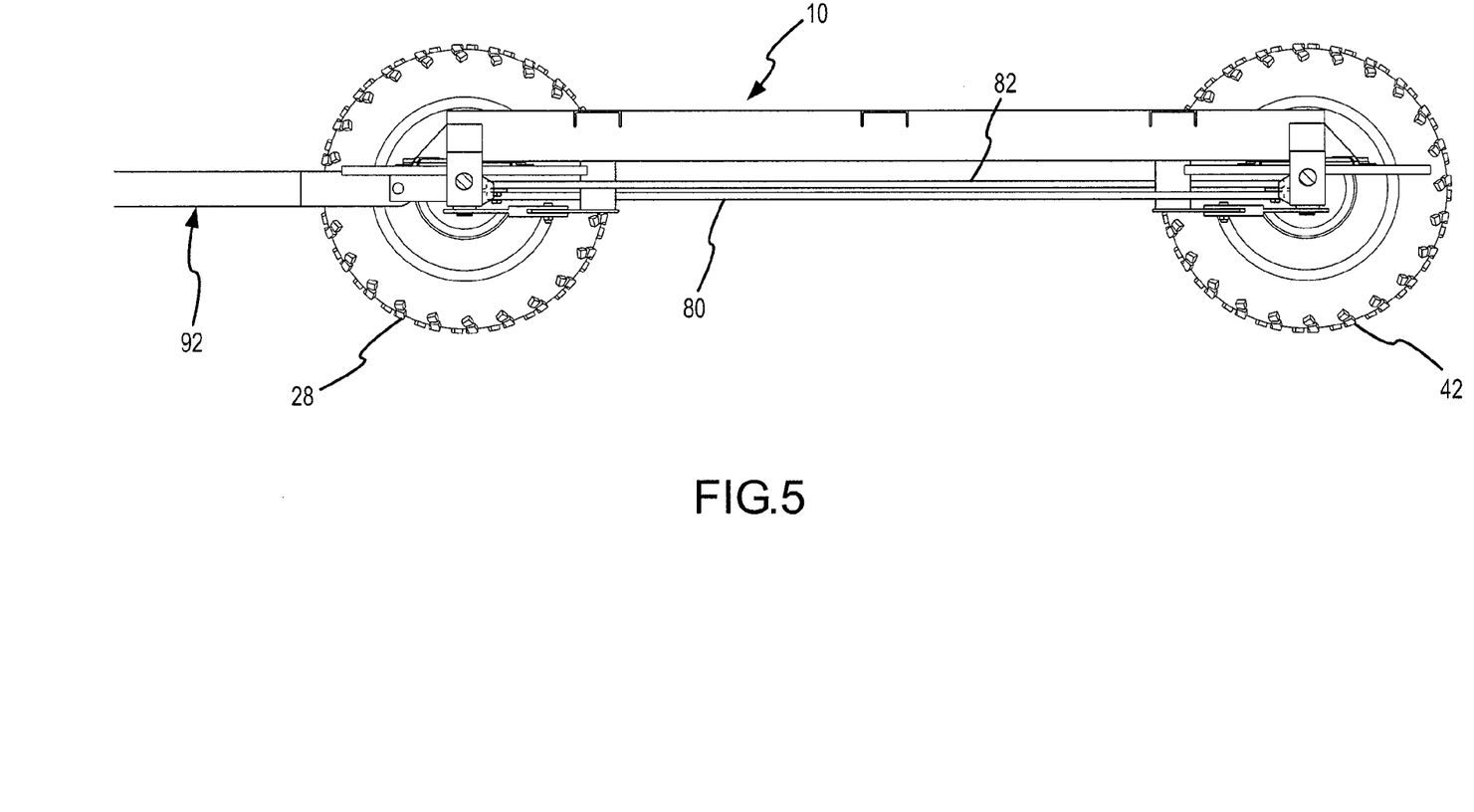
FIG. 5 is a section view taken along line 5 of FIG. 4.

FIG. 5 shows a section view taken along line 5 of the trailer of FIG. 4. The two members 80, 82 interconnecting the front axle beam 18 and rear axle beam 30 are generally positioned parallel to one another with one member above the other. As previously mentioned above, this may be accomplished by mounting one member to the top side of the mounting brackets and mounting the other member to the bottom side of the mounting brackets.

Figure 6:
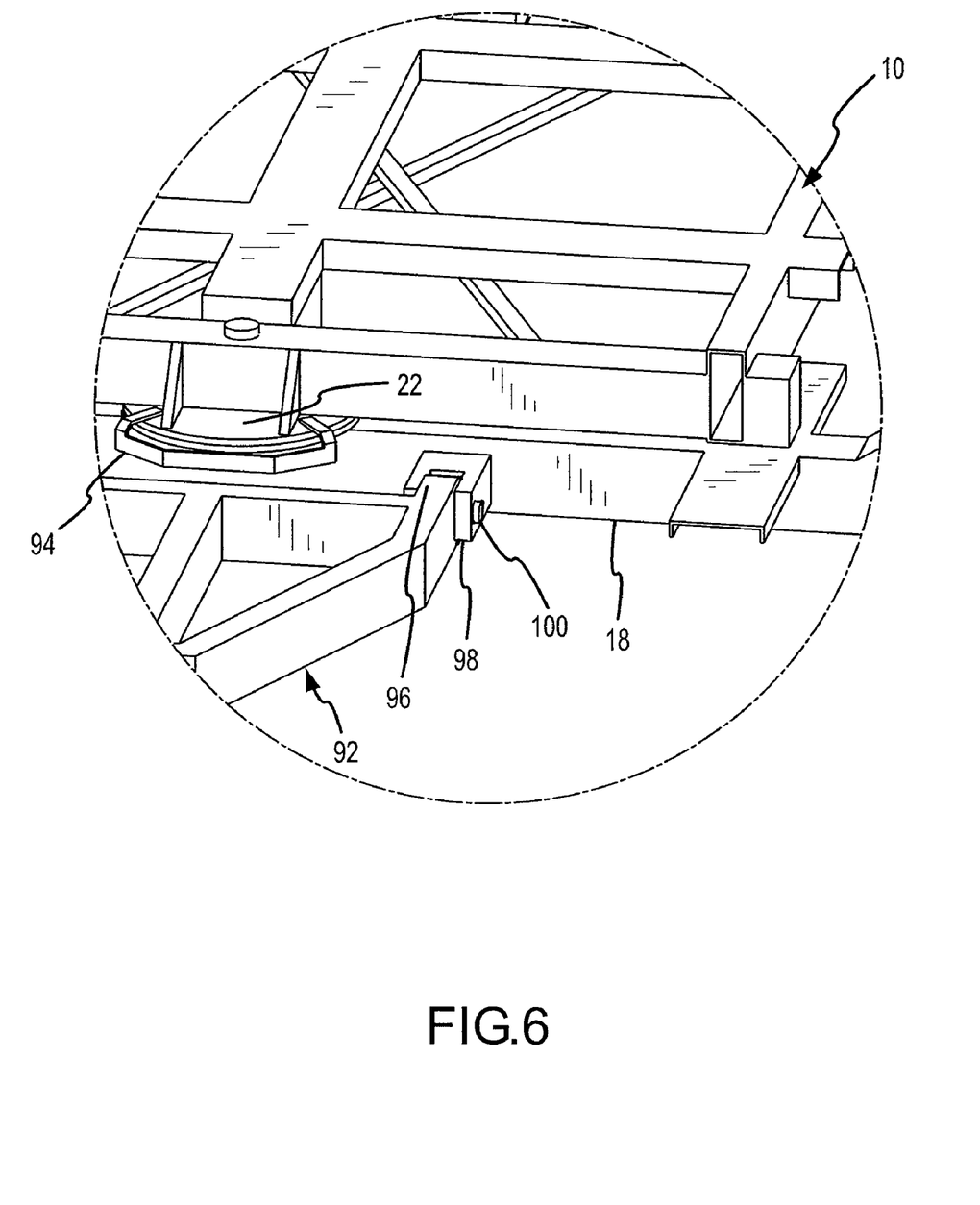
FIG. 6 is a close-up view of the right front of the trailer.

FIG. 6 shows a close-up view of the right front section of one embodiment of the trailer. A hitch assembly 92 is pivotally connected to the front axle beam 18. Each side of the hitch assembly has a projection 96 that fits in a u-shaped bracket 98. A pin 100 secures each side projection of the hitch within the u-shaped bracket and allows the hitch assembly 92 to pivot vertically relative to the front axle beam 18. Other embodiments may use a nut, bolt, washer and sleeve instead of a pin.

Figure 7:
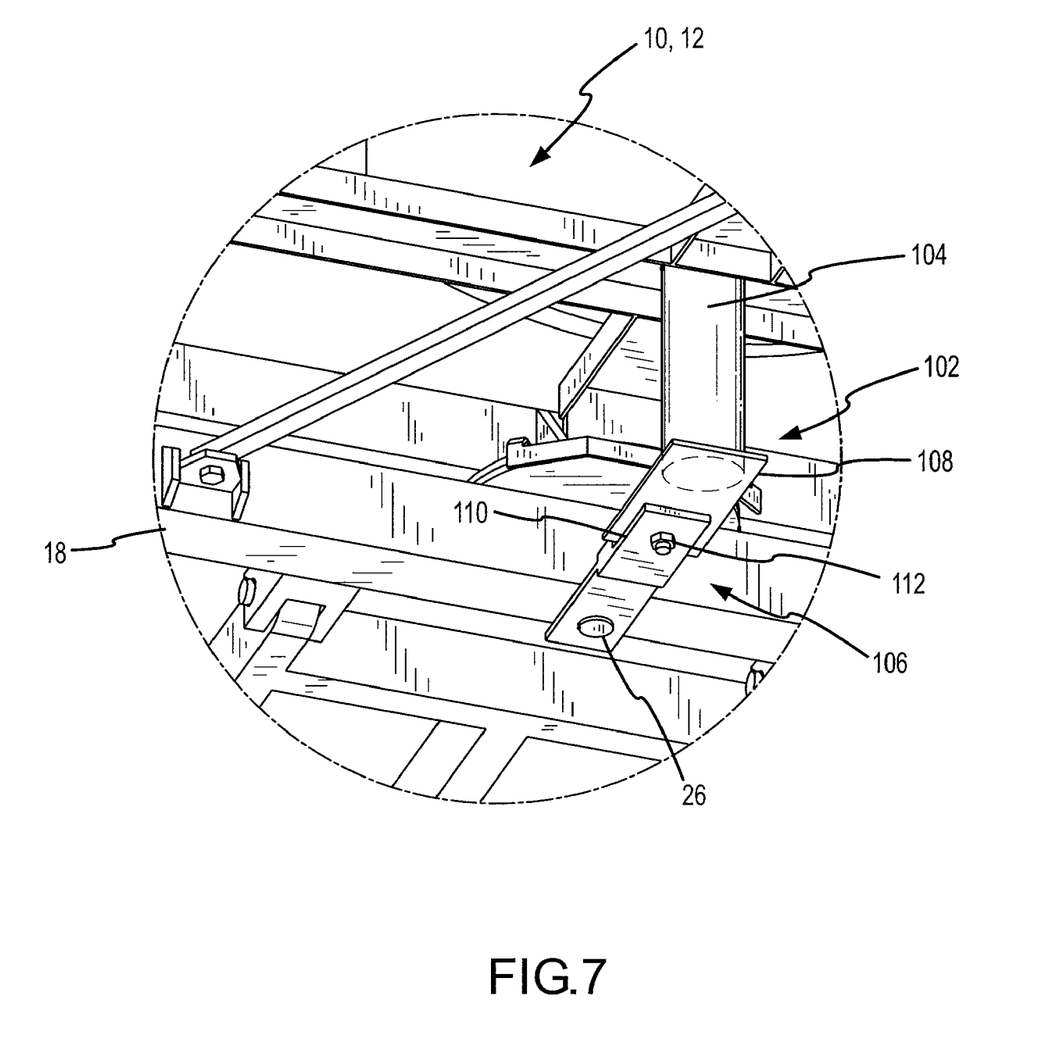
FIG. 7 is a close-up view of a stabilizing arm of one embodiment of the trailer.

To provide further support of the trailer bed frame assembly relative to the axle beams, in one embodiment of the present invention, a support assembly may be connected between the frame assembly and the king pin. FIG. 7 shows a close-up view of one of the support assemblies. The support assembly 102 includes a tubular support 104 extending downward from the front section 12 of the frame assembly 10, just rearward of the front king pin 26. The support assembly further includes a hinge plate assembly 106 pivotally coupled to the king pin and extending rearward to the bottom of the tubular support, where it is pivotally attached thereto. The hinge plate assembly includes a plate 108 that fits into a u-shaped bracket 110 attached to the king pin. A pin 112 passes through the u-shaped bracket and the plate, allowing the front axle beam 18 to rotate horizontally relative to the stationary plate and tubular support. The tubular support provides rigidity and stabilizes the front axle beam against vertical rotation that may be caused by the front wheels passing over or encountering objects such as rocks. The rear axle beam is stabilized against vertical rotation by a similar tubular support, plate and u-bracket. In one embodiment, each support assembly is located about eighteen inches from the king pin.

Figure 8:
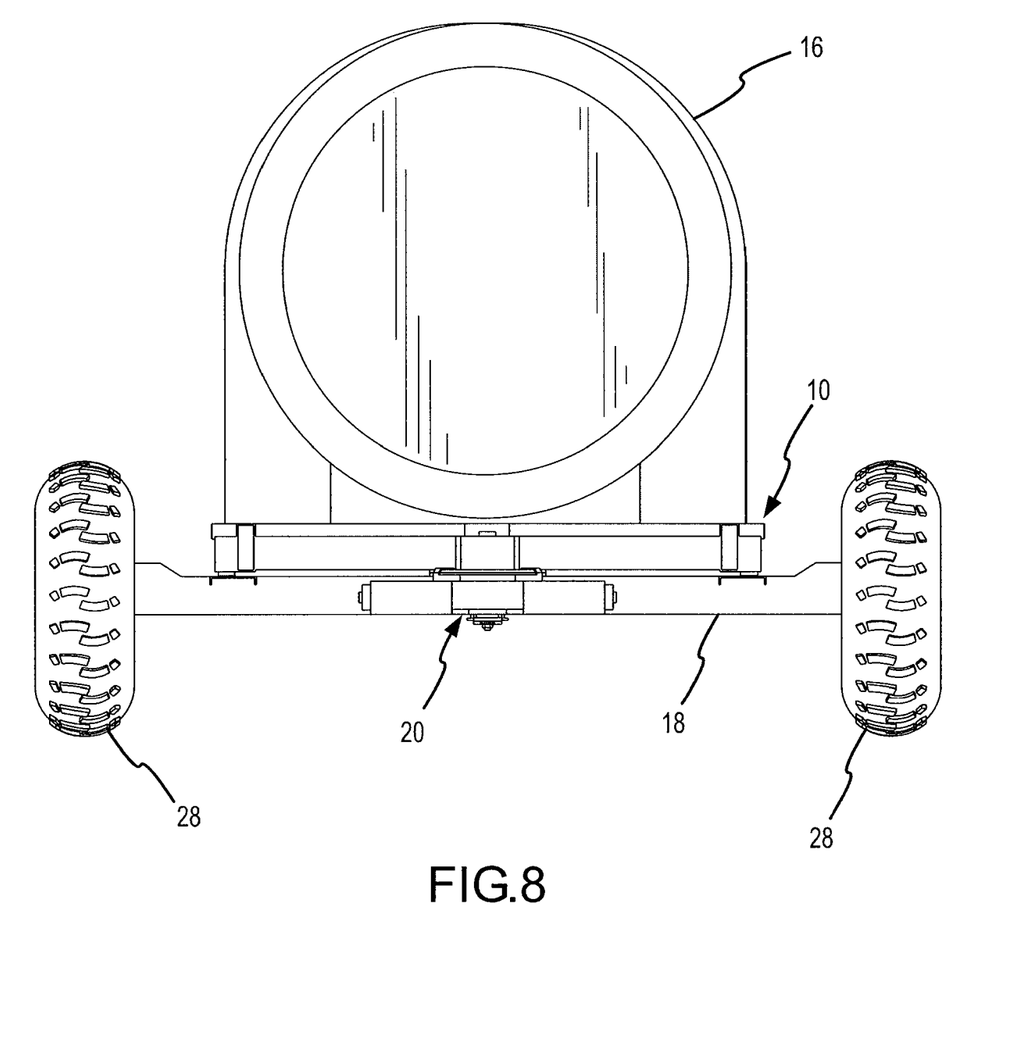
FIG. 8 is a front view of the trailer.

FIG. 8 shows a front view of the trailer. The trailer has a front axle beam 18 to which wheels 28 are rotationally connected at each end. A plate assembly 20 rotationally connects the axle beam to the trailer frame assembly 10 supporting a tank 16.

Figure 9:
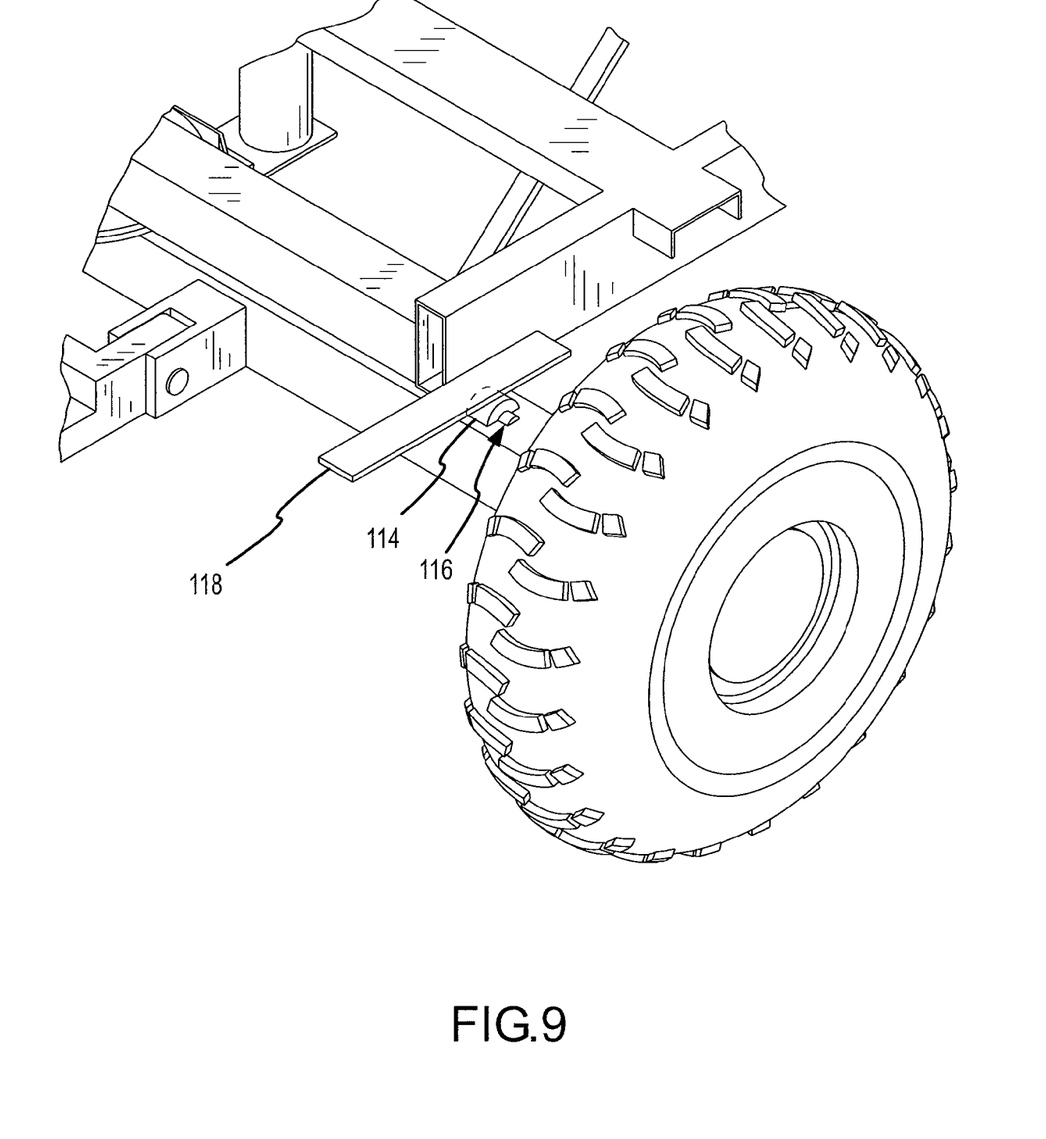
FIG. 9 is a close-up isometric view of an alternative castor and track configuration conforming to aspects of the present invention.
Figure 10:
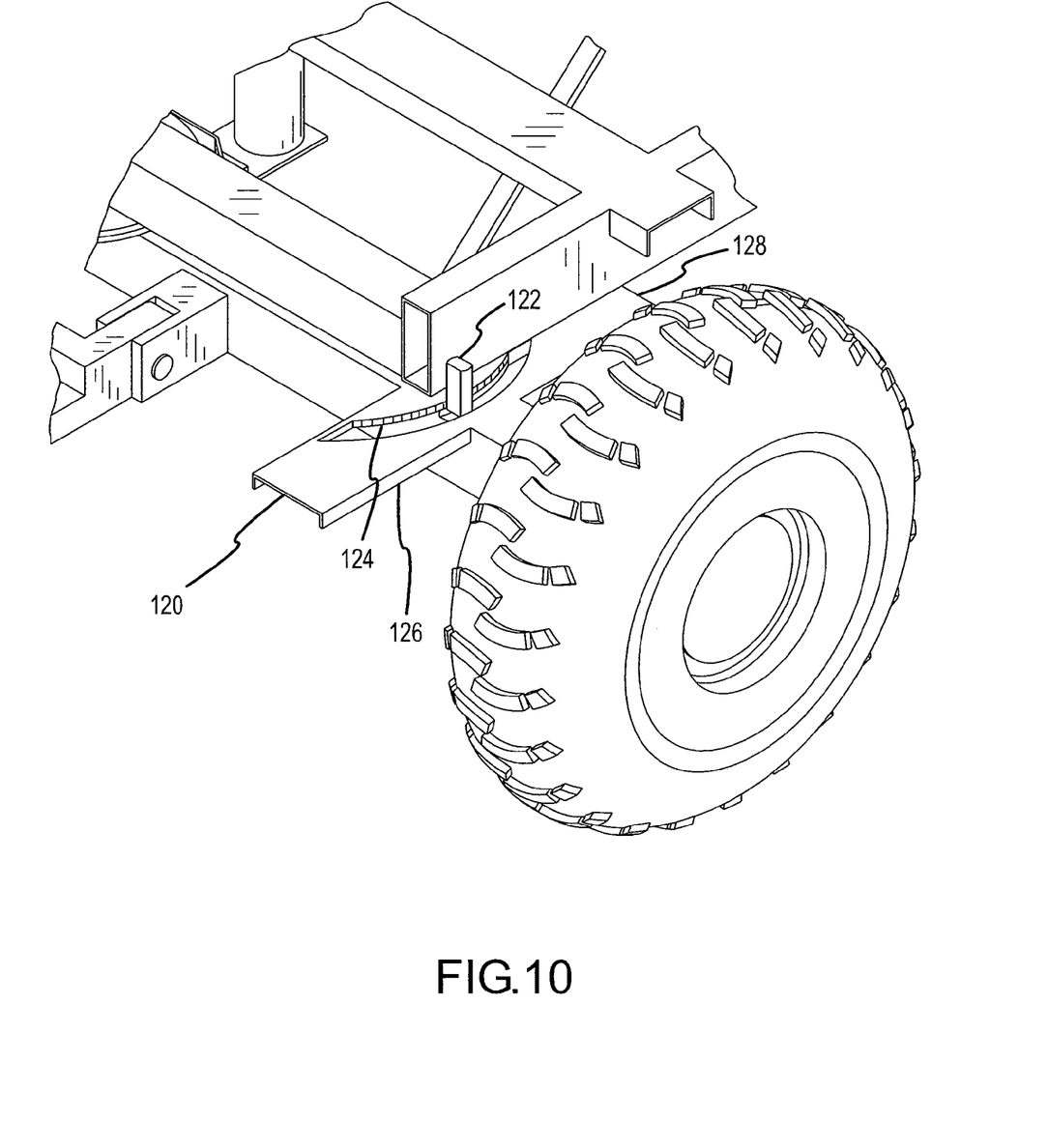
FIG. 10 is a close-up isometric view of a load stabilizing configuration conforming to aspects of the present invention.

As previously described above, one embodiment of the invention uses castors rotationally coupled to the frame assembly and tracks mounted to the axle beams to stabilize the trailer load and reduce shear forces on the king pins and members. Other embodiments may use other configurations and components to stabilize the load as shown in FIGS. 9 and 10. FIG. 9 illustrates an alternative castor and track configuration. In this particular configuration, each castor 114 is mounted into a recessed opening 116 in the axle beam. A track 118 is attached to the frame assembly at each corner to provide a rolling surface for the corresponding castor. As the trailer turns, each castor traces an arc along the corresponding track.

FIG. 10 shows yet another embodiment that uses slotted tracks 120 attached to the axle beams. A rectangular extrusion 122 attached to each corner of the frame assembly mates with a slot 124 in the corresponding track. Each track has a front section 126 extending forward from the axle beam and a rear section 128 extending rearward from the axle beam. As the trailer turns, the frame assembly slides along the track and each rectangular extrusion moves within the slot of the track.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "sides" having a particular characteristic and/or being connected to another part. However, those skilled in the art will recognize that the present invention is not limited to components which terminate immediately beyond their points of connection with other parts. Thus, the term "side" should be interpreted broadly, in a manner that includes areas adjacent, rearward, forward of, or otherwise near the terminus of a particular element, link, component, member or the like. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A trailer comprising:
a frame assembly with a front section and a rear section;
a front axle beam rotatably coupled to the front section of the frame assembly, the front axle beam rotatably supporting a pair of front wheels;
a rear axle beam rotatably coupled to the rear section of the frame assembly, the rear axle beam rotatably supporting a pair of rear wheels;
at least one member operably coupled between the front axle beam and the rear axle beam;
whereby the at least one member synchronizes turning of the front axle with the rear axle; and
at least one load stabilizing assembly operably positioned between at least one of the axle beams and a corresponding portion of the frame assembly, wherein the load stabilizing assembly comprises at least one track and at least one rotating member operably positioned to roll on the at least one track,
wherein the at least one rotating member comprises a left castor rotatably connected to a left side of the frame assembly and a right castor rotatably connected to a right side of the frame assembly;
wherein the at least one track comprises a left track operably connected to a left portion of the axle beam to be in contact with the first castor and a right track operably connected to a right portion of the axle beam to be in contact with the second castor; and
wherein each castor travels along the corresponding track as the frame assembly rotates relative to the axle beam.

2. The trailer of claim 1 further comprising:
a first disk having two vertical plates attached to form a u-shaped bracket, the first disk rotatably coupled to the front section of the frame assembly with a pin passing through the two vertical plates and the front section of the frame assembly;
a second disk connected to a top side of the front axle beam;
a third disk connected to a bottom side of the rear section of the frame assembly;
a fourth disk connected to a top side of the rear axle beam;
wherein the front axle beam is rotatably coupled to the front section of the frame with a first king pin passing through the first disk, the second disk and the front axle beam; and
wherein the rear axle beam is rotatably coupled to the rear section of the frame with a second king pin passing through the rear section of the frame assembly, the third disk, the fourth disk and the rear axle beam.

3. The trailer of claim I further comprising:
a first disk connected to a bottom side of the front section of the frame assembly;
a second disk connected to a top side of the front axle beam;
a third disk connected to a bottom side of the rear section of the frame assembly;
a fourth disk connected to a top side of the rear axle beam;
wherein the front axle beam is rotatably coupled to the front section of the frame with a first king pin passing through the front section of the frame assembly, the first disk, the second disk and the front axle beam; and
wherein the rear axle beam is rotatably coupled to the rear section of the frame with a second king pin passing through the rear section of the frame assembly, the third disk, the fourth disk and the rear axle beam.

4. The trailer of claim 1 further comprising a hitch pivotally connected to the front axle beam.

5. The trailer of claim 1 wherein the at least one member comprises:
a first member pivotally connected at a left section of the front axle beam and pivotally connected at a right section of the rear axle beam; and a second member pivotally connected at a right section of the front axle beam and pivotally connected at a left section of the rear axle beam.

6. The trailer of claim 5 wherein the first member is attached between the front and rear axle beams such that it is above the second member.

7. The trailer of claim 5 whereby the movement of the first member and second member as the front axle beam rotates causes the rear axle beam to rotate in the opposite direction.

8. The trailer of claim 7 wherein the degree of rotation of the front axle beam and of the rear axle beam are about equal but in opposite directions relative to the frame assembly.

9. The trailer of claim 1 wherein the at least one load stabilizing assembly comprises a rear load stabilizing assembly operably connected to the rear axle beam and the rear section of the frame assembly.

10. The trailer of claim 9 wherein the at least one load stabilizing assembly further comprises a front load stabilizing assembly operably connected to the front axle beam and the front section of the frame assembly.

11. The trailer of claim 2 further comprising
a rotational limit mechanism; and
wherein the rotational limit mechanism limits the degree of rotation of the front and rear axle beams relative to the frame assembly.

12. The trailer of claim 11 wherein the limit mechanism prevents the front and rear pair of wheels from contacting the frame assembly as the trailer turns.

13. The trailer of claim 1 further comprising:
a front support assembly to stabilize the front axle beam against vertical rotation, the front support assembly comprising:
a support member extending downward from the front section of the frame assembly; and
a link pivotally connected between the member and the front king pin; and
a rear support assembly to stabilize the rear axle beam against vertical rotation, the rear support assembly comprising:
a second support member extending downward from the rear section of the frame assembly; and
a second link pivotally connected between the member and the rear king pin.

14. A trailer comprising:
a frame assembly with a front section and a rear section;
a front axle beam rotatably coupled to the front section of the frame assembly, the front axle beam rotatably supporting a pair of front wheels;
a rear axle beam rotatably coupled to the rear section of the frame assembly, the rear axle beam rotatably supporting a pair of rear wheels;
a rear load stabilizing mechanism operably connected between the rear axle beam and the rear section of the frame assembly, the rear load stabilizing mechanism comprising:
at least one rotating member rotatably connected to the frame assembly;
at least one track attached to the rear axle beam; and
wherein the at least one rotating member rolls along the at least one track when the trailer corners;
at least one member operably coupled between the front axle beam and the rear axle beam; and
whereby the at least one member synchronizes turning of the front axle with the rear axle.

15. The trailer of claim 14 further comprising a front load stabilizing mechanism operably connected between the front axle beam and the front section of the frame assembly, the front load stabilizing mechanism comprising:
at least one other rotating member rotatably connected to the frame assembly;
at least one other track attached to the front axle beam; and
wherein the at least one other rotating member rolls along the at least one other track when the trailer corners.

16. The trailer of claim 14 wherein the at least one rotating member comprises:
a left castor rotationally connected to a left side of the frame assembly;
a right castor rotationally connected to a right side of the frame assembly;
wherein the at least one track comprises:
a left track operationally connected to a left side of the rear axle beam; and
a right track operationally connected to a right side of the rear axle beam.

17. The trailer of claim 14 further comprising:
a front support assembly to stabilize the front axle beam against vertical rotation, the front support assembly comprising:
a support member extending downward from the front section of the frame assembly; and
a link pivotally connected between the member and the front king pin; and
a rear support assembly to stabilize the rear axle beam against vertical rotation, the rear support assembly comprising:
a second support member extending downward from the rear section of the frame assembly; and
a second link pivotally connected between the member and the rear king pin.

18. The trailer of claim 14 wherein the at least one member is a means for synchronizing the rotation of the rear axle beam with the front axle beam.

19. The trailer of claim 14 wherein the at least one member is a means for synchronizing the rotation of the rear axle beam with the front axle beam.

* * * * *